United States Patent [19]

Worrel et al.

[11] Patent Number: 5,571,252

[45] Date of Patent: Nov. 5, 1996

[54] HIGH FREQUENCY, LOW AMPLITUDE, SOD HARVESTING APPARATUS

[75] Inventors: Vernon J. Worrel, Mahtomedi, Minn.; Brian L. Bouchard, West Kingston, R.I.; Scott Kaercher, Blaine, Minn.; Jerry Anderson, Somerset, Wis.; James Stewart, Shoreview, Minn.

[73] Assignee: Turfco Manufacturing, Incorporated, Minneapolis, Minn.

[21] Appl. No.: 465,722

[22] Filed: Jun. 6, 1995

Related U.S. Application Data

[62] Division of Ser. No. 923,244, Jul. 31, 1992, Pat. No. 5,454,433.

[51] Int. Cl.[6] ................................................. A01B 45/04
[52] U.S. Cl. ............................... 172/20; 172/40; 414/911
[58] Field of Search ................................. 172/19, 20, 40, 172/483, 484, 307, 101; 364/508, 509, 550; 242/68.4, 68.7, 107; 411/911, 24.5, 24.6

[56] References Cited

U.S. PATENT DOCUMENTS

| | | | |
|---|---|---|---|
| 2,533,542 | 12/1950 | Walz et al. | 172/307 |
| 2,617,347 | 11/1952 | Provost | 172/20 |
| 2,631,513 | 3/1953 | Silver et al. | 172/307 |
| 3,357,499 | 12/1967 | Finneyfrock . | |
| 3,540,535 | 11/1970 | Brouwer et al. | 172/20 |
| 3,672,452 | 6/1972 | Miner | 172/19 |
| 3,807,504 | 4/1974 | Nunes, Jr. | 172/20 |
| 3,812,918 | 5/1974 | Beck | 172/19 |
| 3,856,090 | 12/1974 | Haffner et al. | 172/20 |
| 3,887,013 | 6/1975 | Helberg | 172/20 |
| 3,913,682 | 10/1975 | Kaercher, Jr. et al. | 172/20 |
| 4,330,156 | 5/1982 | Gurries | 172/40 |
| 4,354,556 | 10/1982 | Evans | 172/19 |
| 4,516,639 | 5/1985 | Hammarlund et al. | 172/99 |
| 4,616,713 | 10/1986 | Shattuck | 172/19 |
| 4,892,152 | 1/1990 | van Vuuren | 172/20 |
| 4,892,153 | 1/1990 | Cooling et al. | 172/20 |
| 4,966,239 | 10/1990 | Hutchison | 172/20 |
| 5,454,433 | 10/1995 | Worrel et al. | 172/20 |

FOREIGN PATENT DOCUMENTS

| | | | |
|---|---|---|---|
| 471189 | 10/1914 | France | 172/101 |

OTHER PUBLICATIONS

The Maxi-Roll High Volume Sod Harvester Teledyne Princeton, Canal Winchester, Ohio 43110.

*Primary Examiner*—Spencer K. Warnick, IV
*Assistant Examiner*—Robert Pezzuto
*Attorney, Agent, or Firm*—Peterson, Wicks, Nemer & Kamrath, P.A.

[57] ABSTRACT

A sod harvesting apparatus (10) is disclosed including a cut-off device (14), a cutting unit (16) and a roll-up and core carrying device (18) mounted to a tractor (12). The cut-off device (14) includes an H-shaped slide (20) including a blade (26) pivotably attached thereto, slideably movable in tubes (30) from a cutting position to a raised position against the bias of springs (32) in the tubes (30) by a hydraulic cylinder (36), and latched in the raised position by a mechanism (38). The cutting unit (16) includes a blade assembly (66) pivotably mounted to a frame (52) and vibrated at a high frequency and low amplitude by vibrating devices (84) mounted on the frame (70) of the blade assembly (66). A roller drum (90) extends between first and second lever arms (92) pivotably mounted to the frame (52) and pivoted by electric actuators (96). The roll-up device (18) includes first and second arms (110,112) carrying cone-shaped spindles (120) pivotably mounted to the opposite ends of a bar (114). The first arm (110) is pivoted by a hydraulic cylinder (126) and the second arm (112) is simultaneously pivoted by a rod (122) having a first end pivotably mounted to the first arm (110) on the side of the pivot axis (116) opposite the spindle (120) and a second end pivotably mounted to the second arm (112) on the same side of the pivot axis (116) as the spindle (120).

15 Claims, 3 Drawing Sheets

HIGH FREQUENCY, LOW AMPLITUDE, SOD HARVESTING APPARATUS

CROSS REFERENCE

The present application is a division of Ser. No. 07/923,244 filed Jul. 31, 1992, now U.S. Pat. No. 5,545,433.

BACKGROUND

The present invention generally relates to the harvesting of sod, particularly to units and devices utilized in the harvesting of sod, and specifically to the harvesting of sod in large rolls which minimizes manual labor.

various apparatus have been utilized for the harvesting of sod, with such apparatus having various shortcomings which detract from their utility and marketability. Generally, such prior apparatus include a blade which was reciprocated at low frequencies and large amplitudes utilizing an eccentric drive which is of complicated design including multiple parts which are subject to wear and produce large levels of noise and vibration. Also, such prior apparatus had difficulties in cutting sod evenly and thinly especially when cutting under uneven field conditions and contours, when cutting from soft, spongy soils such as peats, when cutting under wet conditions, and the like. Also, such prior apparatus often did not lend themselves to automatic operation and required manual control, otherwise required strenuous manual labor in the production of sod, and were otherwise deficient resulting in loss in productivity. Thus, a need exists for units, devices, and apparatus for the harvesting of sod which increases productivity while reducing the amount of labor and maintenance required.

SUMMARY

The present invention solves the above need and other problems in the field of sod harvesting by providing, in the most preferred form, a blade assembly which is vibrated at a high frequency in the range of 3,000 to 7,000 cycles per minute and in the most preferred form in the order of 5,000 cycles per minute and at a low amplitude in the range of 0.15 to 1.27 centimeters and in the most preferred form in the order of 0.15 centimeters.

In another aspect of the present invention, the blade assembly is mounted to the frame, and a roller drum extends between first and second lever arms which are pivotably mounted to the frame, with pivoting of the ever arms changing the spacing between the cutting edge of the blade of the blade assembly and the roller drum.

In a further aspect of the present invention, a cut-off device is provided including a slide having a cut-off blade pivotably attached thereto which is moved from a cutting position to a raised position against the bias of biasing means such as springs. In a preferred aspect of the present invention, the slide is releasably latched in the raised position by a J-shaped hook member which is pivotable between a latch position and an unobstructed position. In a preferred form of the present invention, the movement of the slide is controlled and actuated utilizing signals provided by an encoder attached to the roller drum of the sod cutting unit.

In still another aspect of the present invention, the first and second arms which carry core spindles in a roll-up device are simultaneously pivoted by a rod having a first end pivotably mounted to the first arm on the side of the arm pivot axis opposite the spindle and having a second end pivotably mounted to the second arm on the same side of the arm pivot axis as the spindle, with the first arm being pivoted by suitable means such as a hydraulic cylinder.

It is thus an object of the present invention to provide a novel apparatus for harvesting sod.

It is further an object of the present invention to provide such a novel sod harvesting apparatus having fewer parts and a simple design.

It is further an object of the present invention to provide such a novel sod harvesting apparatus including a high frequency, low amplitude, vibrating blade.

It is further an object of the present invention to provide such a novel sod harvesting apparatus which dramatically reduces apparatus noise and vibration.

It is further an object of the present invention to provide such a novel sod harvesting apparatus which is versatile in the cutting of sod strips of various widths and lengths.

It is further an object of the present invention to provide such a novel sod harvesting apparatus requiring less maintenance.

It is further an object of the present invention to provide such a novel sod harvesting apparatus reducing the amount of labor required and eliminating strenuous manual labor.

It is further an object of the present invention to provide such a novel sod harvesting apparatus which can consistently cut the sod evenly and thinly.

It is further an object of the present invention to provide such a novel sod harvesting apparatus operable on uneven field conditions and contours.

It is further an object of the present invention to provide such a novel sod harvesting apparatus which cuts sod from soft, spongy soils.

It is further an object of the present invention to provide such a novel sod harvesting apparatus operable under wet conditions.

It is further an object of the present invention to provide such a novel sod harvesting apparatus including a unique manner of adjusting the thickness of the sod which can be easily and automatically controlled.

It is further an object of the present invention to provide such a novel sod harvesting apparatus including a unique cut-off device which can be automatically controlled.

It is further an object of the present invention to provide such a novel sod harvesting apparatus including a roll-up device which simultaneously releases the roll core automatically and can be adjusted to any roll size.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
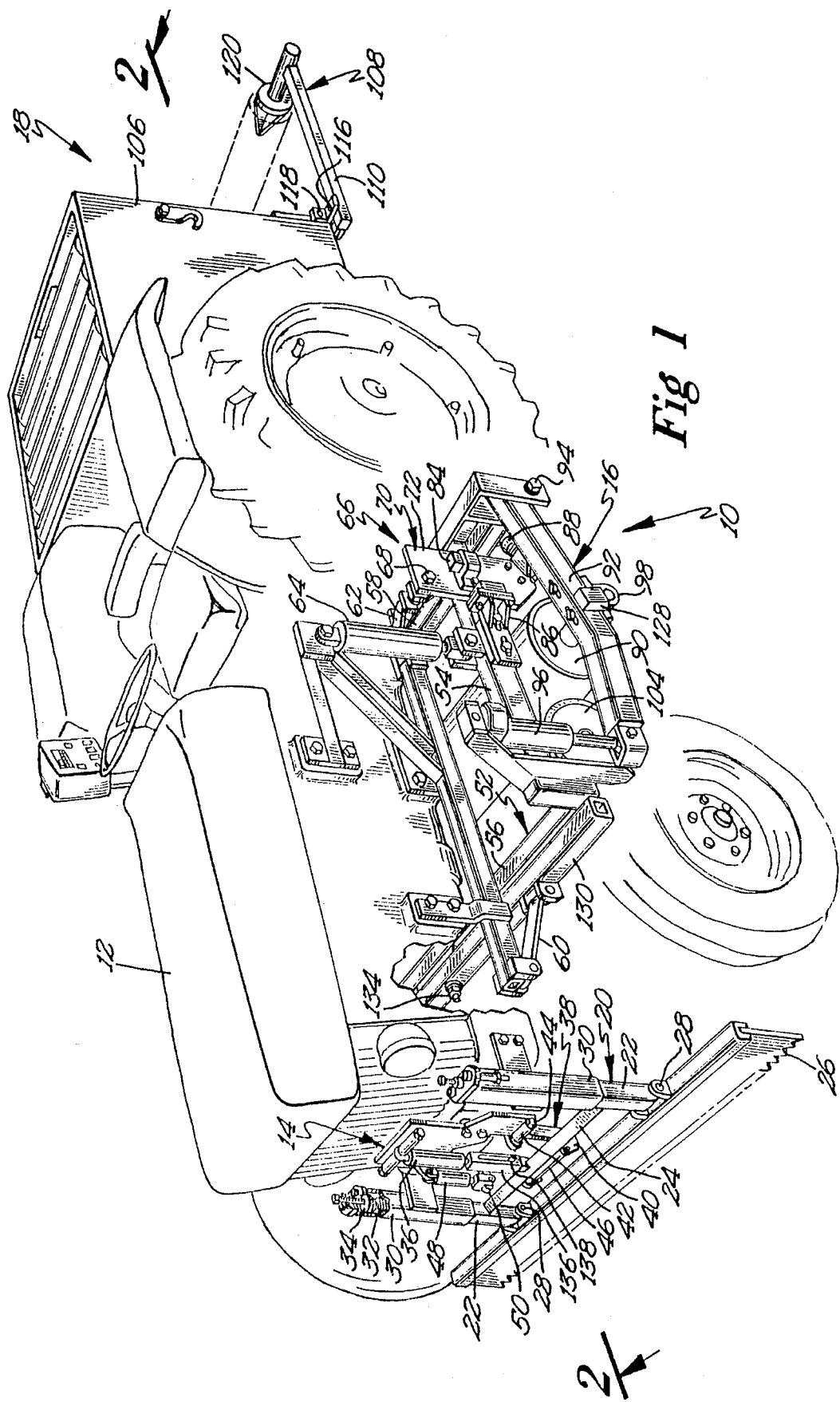
FIG. 1 shows a perspective view of an apparatus for harvesting sod according to the preferred teachings of the present invention.
Figure 2:
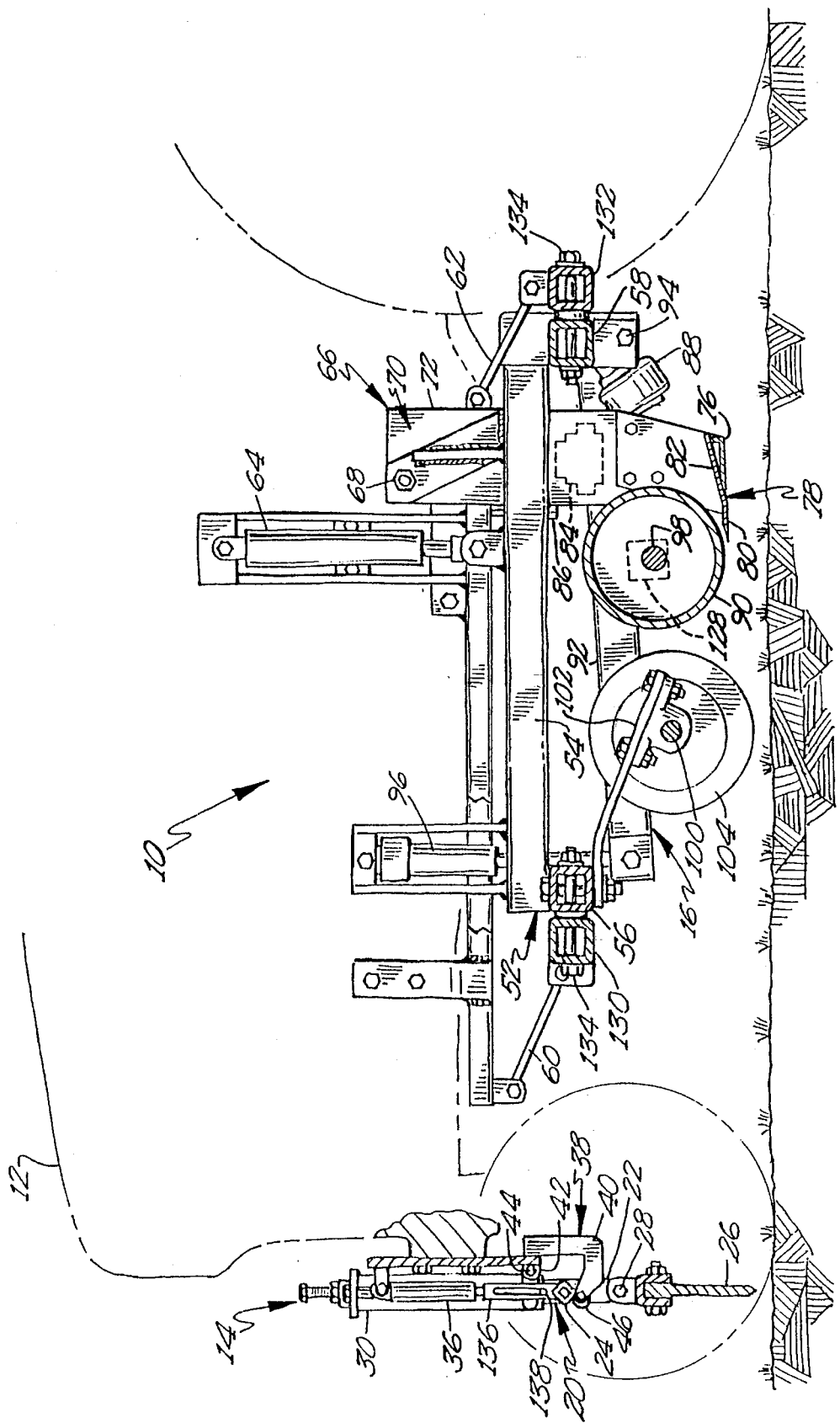
FIG. 2 shows a cross-sectional view of the apparatus of FIG. 1 according to section line 2—2 of FIG. 1.
Figure 3:
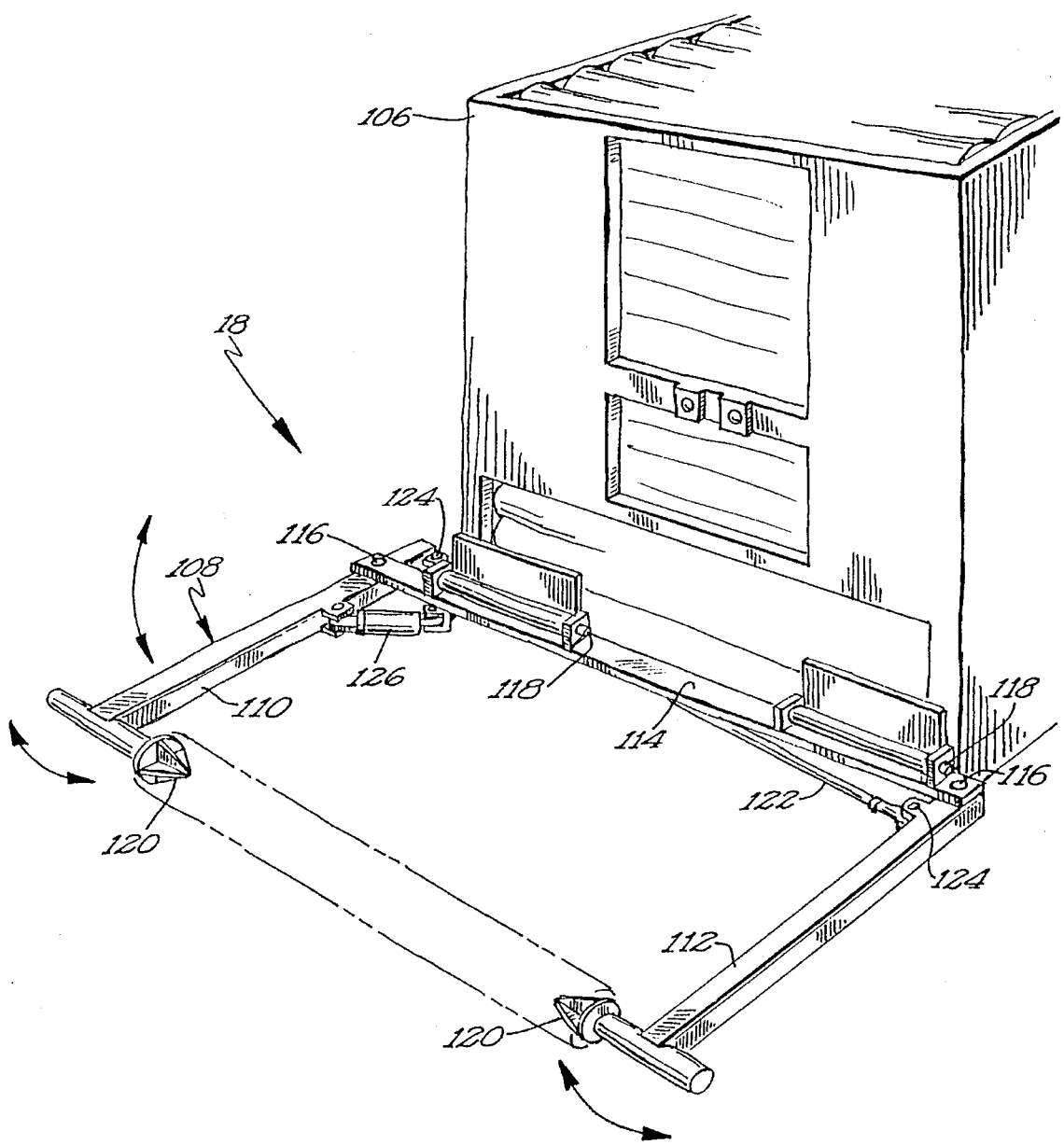
FIG. 3 shows a rear perspective view of the roll-up device of the apparatus of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "front", "back", "outer", "upper", "lower", "height", "width", "end", "side", "horizontal", "vertical", "forward", and similar terms are used herein, it should be understood that these terms have reference only to the structure shown in the drawings as it would appear to a person viewing the drawings and are utilized only to facilitate describing the invention.

DESCRIPTION

An apparatus for harvesting sod according to the preferred teachings of the present invention is shown in the drawings and generally designated 10. In the most preferred form, apparatus 10 is mounted to a tractor 12 of any conventional design. Apparatus 10 of the most preferred form generally includes a cut-off device 14, a cutting unit 16, and a roll-up and core carrying device 18.

Cut-off device 14 generally includes a slide 20 of a generally H-configuration including first and second legs 22 and a cross bar 24. A cut-off blade 26 of the desired width of sod is pivotably attached to the lower ends of legs 22 such as by bolts 28 generally parallel to and spaced below cross bar 24. First and second vertical tubes 30 are mounted to the frame of tractor 12 adjacent the front thereof for slideably mounting slide 20 to tractor 12 between a raised position and a cutting position. Specifically, tubes 30 in the most preferred form are of a size and shape for the slideable receipt of legs 22. In the most preferred form, a spring 32 is provided sandwiched between the upper end of leg 22 and a stop 34 adjustably positioned adjacent the end of each tube 30 such as by bolts as shown to bias slide 20 from its raised position to its cutting position. A hydraulic cylinder 36 extending between the frame of tractor 12 and cross bar 24 is provided to move slide 20 from its cutting position to its raised position against the bias of springs 32. In its most preferred form, the piston of cylinder 36 extends into a tube 136 upstanding from cross bar 24. A pin 138 extends through vertical slots formed in tube 136 and the free end of the piston of cylinder 36 to create a lost motion.

Cut-off device 14 further includes a latching mechanism 38 to hold slide 20 in its raised position. Specifically, mechanism 38 includes first and second J-shaped hook members 40 having their upper ends integrally secured to collars 42 which are pivotably mounted to the frame of tractor 12 such as by bolts 44. The opposite ends of first and second hook members 40 are secured together by a cylindrical roller spacer 46. First and second hook members 40 are pivotal between a latch position and an unobstructing position in the preferred form by a hydraulic cylinder 48 extending between the frame of tractor 12 and a tab 50 integrally secured to collar 42.

Cutting unit 16 according to the preferred teachings of the present invention generally includes a rectangular apparatus frame 52 including first and second sides 54 interconnected together by a front member 56 and a back member 58. Frame 52 is mounted below the frame of tractor 12 and between the front and rear wheels of tractor 12 generally horizontally and parallel to the support surface or turf. In the most preferred form, frame 52 is mounted for vertical and horizontal movement utilizing a parallelogram structure and specifically includes first links 60 pivotably mounted to the frame of tractor 12 and a front carrier 130 and second links 62 pivotably mounted to the frame of tractor 12 and back carrier 132. Front carrier 130 is pivotably mounted to front member 56 of frame 52 and back carrier 132 is pivotably mounted to back member 58 of frame 52 about a longitudinal pivot axis defined in the preferred form by bolts 134. In the most preferred form, the length of links 60 and 62 between their respective pivots are equal, and the spacing between the pivots of tractor 12 and between the pivots of carriers 130 and 132 with links 60 and 62 are equal, with links 60 and 62 extending forward from frame 52 to tractor 12 at equal angles. First and second hydraulic cylinders 64 extend from the frame of tractor 12 to first and second sides 54 of frame 52, with the simultaneous extension and retraction of cylinders 64 causing frame 52 to move generally vertically while maintaining a generally horizontal condition.

Cutting unit 16 further includes a blade assembly 66 which is pivotably mounted to sides 54 of frame 52 such as by bolts 68. Specifically, blade assembly 66 includes a frame 70 of a generally U-shape having first and second legs 72 and a blade support bar 76 extending between the lower ends of legs 72. Bolts 68 extend through and pivotably mount the upper ends of legs 72 to frame 52. A blade 78 of a generally V-shape is removably secured to support bar 76 and includes a horizontal portion 80 having a sharpened, cutting edge and an angled portion 82 extending at an obtuse angle from portion 80. In the most preferred form, the pivot axis defined by bolts 68 is located vertically above the sharpened, cutting edge of blade 78. Blade assembly 66 further includes first and second high frequency, low amplitude vibrating devices 84 mounted to legs 72. Vibrating devices 84 can be electrically, hydraulically, or mechanically actuated and in the preferred form are supplied by VIBCO INC. of Wyoming, R.I. 02898. In order for blade assembly 66 to move by action of vibrating device 84 and yet be restrained to maintain its best cutting attitude, stops 86 are provided on sides 54 of frame 52 in front of and for abutment with legs 72 of blade assembly 66. Additionally, for biasing legs 72 of blade assembly 66 forward against stops 86, for absorbing the forces imparted to blade 78 by the forward movement of tractor 12, and to permit blade 78 to move in a controllable fashion to cut sod properly, a flexible stop 88 is provided between each of the sides 54 of frame 52 behind and for abutment with legs 72 of blade assembly 66. In the most preferred form, stop 88 is a rubber air spring which is adjustable in the amount of force which it can absorb by the amount of air put therein.

Cutting unit 16 according to the preferred teachings of the present invention further includes a roller drum 90 for compressing the turf just ahead of blade 78. In the preferred form, roller drum 90 is movable relative to frame 52 and blade assembly 66. Particularly, in the most preferred form, first and second lever arms 92 are pivotably mounted to sides 54 of frame 52 adjacent to front member 56 such as by bolts 94. Each of the lever arms 92 is independently pivoted about bolts 94 by an electric actuator 96 extending between sides 54 of frame 52 adjacent to back member 58 and the free ends of lever arms 92. Roller drum 90 extends between first and second lever arms 92 intermediate their ends and is rotatably mounted relative thereto such as by bearings 98.

Cutting unit 16 according to the preferred teachings of the present invention further includes a supporting shaft 100 mounted to the free ends of leaf springs 102 extending in a cantilever manner from front member 56. Coulter wheels 104 are rotatably mounted on supporting shaft 100 for cutting the sod to the proper width ahead of cutting blade 78 and roller drum 90. The lateral positions of coulter wheels 104 are adjustable and any quantity of coulter wheels 104 may be attached to shaft 100 allowing sod to be cut in the desired number of strips and widths. Coulter wheels 104 are positioned close to roller drum 90 to make it easier for the operator to turn tractor 12 sharper for greater maneuverability in the sod field without damage to the turf.

Device 18 according to the preferred teachings of the present invention generally includes a dispensing bin 106 mounted to the three-point hitch of tractor 12 by any suitable means. Bin 106 has a width generally equal to the core upon which sod can be rolled and has a volume for holding multiple cores. Bin 106 includes a bottom wall which slopes downwardly towards a slot formed in the rear wall having a height greater than the diameter of one core but less than that of two cores. A suitable stop is located in the slot of the rear wall to prevent cores from rolling out but allowing an operator to remove a single core by pulling the core out of the slot and vertically over the stops.

Device 18 according to the preferred teachings of the present invention further includes a roll-up apparatus 108 including first and second arms 110 and 112 pivotably mounted to the opposite ends of a bar 114 such as by bolts 116. Bar 114 is pivotably mounted to bin 106 generally perpendicular to the forward movement direction of tractor 12 such as by bolts 118. The free ends of arms 110 and 112 include rotatable spindles 120 for receipt in the opposite ends of the sod core. In the most preferred form, spindles 120 are cone-shaped to allow easy entry of spindles 120 into the sod core. For pivotably relating arms 110 and 112, a rod 122 extends between and is pivotably mounted to arms 110 and 112 such as by bolts 124, with the pivot defined by bolt 124 located on the side of bolt 116 opposite spindle 120 for arm 110 and located on the same side of bolt 116 as spindle 120 for arm 112. For pivoting arms 110 and 112, a hydraulic cylinder 126 extends between and is pivotably connected to bar 114 and arm 110, with cylinder 126 pivotably connected to arm 110 on the same side of bolt 116 as spindle 120.

Now that the basic construction of apparatus 10 according to the preferred teachings of the present invention has been set forth, the operation and subtle features of apparatus 10 can be set forth and appreciated. Specifically, tractor 12 with apparatus 10 mounted thereon is transported and/or driven to the sod field desired to be harvested. The start of the roll of sod is formed by cut-off device 16. Specifically, in its normal position, cylinder 36 is extended with pin 138 in the lowermost position in the vertical slots of tube 136. With tractor 12 moving in a forward direction, cylinder 48 is actuated by suitable valving to expand and thereby pivot hook members 40 from their latch position to their unobstructed position. With hook members 40 in their unobstructed position, slide 20 is moved under the bias of springs 32 from its raised position to its cutting position, with blade 26 being forced through the turf in the cutting position. In the most preferred form, blade 26 is serrated for ease of entering the ground. Since blade 26 enters the ground while tractor 12 is moving forward, blade 26 is allowed to pivot about bolts 28 to the rear, with the pivotable movement allowing blade 26 to be in the ground without damaging device 14 or disturbing the turf with the forward movement of tractor 12. After slide 20 reaches its cutting position, pin 138 will be in the uppermost position in the vertical slots of tube 136. Slide 20 is raised back to its raised position by the retraction of hydraulic cylinder 36 against the bias of springs 32. With slide 20 in its raised position, cylinder 48 contracts and thereby pivots hook members 40 from their unobstructed position back to their latch position to again hold slide 20 in its raised position, with spacer 46 reducing the friction between cross bar 24 of slide 20 and mechanism 38. With slide 20 latched in its raised position, cylinder 36 is again extended with pin 138 in the lowermost position in the vertical slots of tube 136.

With vibrating device 84 actuated, cutting unit 16 is also lowered by simultaneously extending hydraulic cylinder 64 and lowering frame 52 and blade assembly 66, roller drum 90, and coulter wheels 104 mounted thereto. As cutting unit 16 is lowered, coulter wheels 104 cut through the turf. Simultaneously, blade 78 also enters the turf for severing the sod from the soil. Additionally, roller drum 90 is moved down onto the sod causing compression of the turf just ahead of blade 78. It can then be appreciated that the down pressure for cutting unit 16 utilizes the weight of tractor 12 and is regulated by a control device that provides a preset downward force, via the hydraulic fluid into cylinders 64. It should be appreciated that such preset downward force can be varied according to the particular conditions present at the sod field during harvest.

It should then be noted that blade assembly 66 is particularly advantageous according to the preferred teachings of the present invention. Specifically, the shape and structure of blade 78 and support bar 76 of the preferred form insures that a small vertical area is presented to the ground upon initial entry. A large horizontal area of blade 78 and support bar 76 at initial entry would tend to restrict the ease of entry and would demand more down pressure to penetrate the turf. The angle and degree of sharpness of the cutting edge of horizontal portion 80 of blade 78 effects easy cutting of the turf once blade 78 is in the turf to sever the sod easily and consistently to produce acceptable sod for sale to the customer. The upward bend of blade 78 between portions 80 and 82 provides a measure of rigidity and stiffness to blade 78 as well as directs the cut sod up and over support bar 76 behind blade 78. It can then be appreciated that the rise of the strip of cut sod caused by the upward bend of blade 78 must be controlled to prevent interference with the other components of apparatus 10 and to provide a flow pattern in the piece of sod such that it will fall to the ground behind blade 78 and bar 76 and lie flat thereon, with any unevenness of the sod on the ground potentially causing problems when the sod is rolled.

Additionally, blade assembly 66 is vibrated at a high frequency in the range of 3000 to 7000 cycles per minute and in the most preferred form in the order of 5000 cycles per minute and at a low amplitude in the range of 0.060 inch for mineral soils to 0.50 inch for softer soils such as peat (0.15 to 1.27 centimeters) and in the most preferred form in the order of 0.060 inch (0.15 cm) produced by vibrating devices 84 mounted to legs 72 to cut sod with blade 78. Prior to the present invention, the cutting blade was typically reciprocated by a pitman arm connected to an eccentric drive mounted to the frame at a low frequency in the range of 300 to 1400 cycles per minute and at a high amplitude in the range of 1 to 1½ inches (2.5 to 3.75 cm). It can then be appreciated that the vibration of blade assembly 66 by vibrating devices 84 is much quieter and smoother than prior eccentric drive reciprocation of prior apparatus which were very noisy. It can further be appreciated that vibrating devices 84 of apparatus 10 according to the teachings of the present invention have fewer parts and simpler design which is easier to maintain than prior apparatus and particularly eliminates the eccentric shafts and pitman arms of prior apparatus. Thus, apparatus 10 according to the teachings of the present invention has better reliability of function, has less down time, and is less costly than prior apparatus.

The pivot axis defined by bolts 68 is located directly above the cutting edge of horizontal portion 80 of blade 78 in order for horizontal portion 80 to remain essentially horizontal in the full range of its arc of movement in the ground produced by vibrating devices 84. If horizontal portion 80 would present an angle such that the cutting edge was located vertically above the interconnection of portions 80 and 82, cutting of the turf would be difficult and an upward force component would be generated which would tend to make blade 78 ride out of the ground.

Additionally, the cutting edge of blade 78 is mounted underneath roller drum 90 to improve cutability of sod, particularly of sod grown on soft, spongy soils such as peat. Drum 90 forces the grass stems down onto the ground and holds the plant and its roots in place while blade 78 severs the roots. Without drum 90, blade 78 can have a tendency to simply push the grass roots forward without severing them and they would fold over the cutting edge and eventually build up to a size large enough to prevent any cutting of the roots by blade 78.

In addition to providing an area of stabilization of the soil against which blade 78 can work to sever the sod more effectively caused by the compression of the sod caused by the down pressure resulting from the desired preset downward force created by cylinders 64, roller drum 90 levels the turf for the full width of drum 90 and blade 78 making it possible to cut sod of a uniform thickness consistently and also to cut sod very thin. Additionally, the vibration imparted to roller drum 90 by vibrating devices 84 through bolts 68 and stops 86 and 88 helps to level the turf more quickly and more effectively over the entire width of roller drum 90. Specifically, vibration device 84 in addition to imparting horizontal movement imparts vertical movement to blade assembly 66 and to roller drum 90 which vibrates against the ground and the pressure of cylinder 64, with the vertical vibration being in the range of no movement for hard, mineral soils and 0.060 inches (0.15 cm) for softer soils such as peat. Vertical movement of the traction wheels in prior eccentric drive harvesters was nonexistent, with the blade assembly being limited to horizontal movement by the pitman arm and with vibration of the eccentric drive mounted to the frame being minimized so that vibration throughout the harvester was minimized. With the mounting of vibrating devices 84 directly on blade assembly 66, vibration to roller drum 90 also occurs, with the vertical movement component of that vibration helping to level the turf quickly and effectively.

The contact pressure of roller drum 90 with the turf is controlled by hydraulic cylinders 64 which can be automatically controlled to maintain a predetermined and preset pressure or force required to insure that proper contact is maintained for good contact, with the preset pressure being variable to match the conditions or the contours of the sod field. In this regard, it can be appreciated that roller drum 90 levels out the particular contour of the sod field. Additionally, the suspension of frame 52 and blade assembly 66, roller drum 90, and coulter wheels 104 mounted thereon by links 60 and 62 and the pivotal mounting of frame 52 relative to carriers 130 and 132 in the most preferred form allow apparatus 10 to follow the contour established in the ground by roller drum 90 to cut the sod evenly. This is particularly important in sod fields where the surface area is not totally flat and level because of the large width of blade 78 and roller drum 90 of apparatus 10 according to the teachings of the present invention. Hydraulic cylinders 64 can also be retracted to provide clearance between frame 52 and blade assembly 66, roller drum 90, and coulter wheels 104 mounted thereon and the ground during transport of tractor 12.

Adjustment of the depth of blade 78 and thus the thickness of sod cut is controlled by electric actuators 96 which pivot lever arms 92 between which roller drum 90 is mounted. Actuators 96 can be individually or simultaneously operable from electric switches in the control box adjacent to the seat of tractor 12 to adjust the sod cutting depth and thickness.

Continuing with the explanation of the operation of apparatus 10, a core taken from bin 106 can be placed between spindles 120 by pivoting arms 110 and 112 apart, utilizing hydraulic cylinder 126, and then together to sandwich the core therebetween. Roll-up apparatus 108 can then be pivoted downward about bolts 118 such that the core engages the ground. As tractor 12 moves forward cutting sod, the cut previously made by cut-off device 14 will pass under tractor 12 and cutting unit 16. When the cut reaches the core held in roll-up apparatus 108, an operator initially wraps the sod around the core. As tractor 12 continues to move forward, the core and sod will roll on the ground and rotate with spindles 120 to continue to wrap the sod as a roll on the core. It can then be appreciated that roll-up apparatus 108 will pivot about bolts 118 as the diameter of the roll of sod increases.

In the most preferred form, an encoder 128 is attached to roller drum 90 for determining the length of the strip of sod. Specifically, encoder 128 sends a signal to a micropressor controlling the valves for cylinders 36 and 48 of cut-off device 14 after the desired number of rotations of roller drum 90. It can then be appreciated that the cut made by cut-off device 14 is the finish of a first strip of sod and the start of the next strip of sod.

As tractor 12 continues to move forward cutting the sod, the cut previously made by cut-off device 14 will pass under tractor 12 and cutting unit 16 to roll-up apparatus 108 marking the completion of that particular roll(s). At that time, arms 110 and 112 can be pivoted apart utilizing cylinder 126 to release the core of the sod roll. After tractor 12 has moved forward from the sod roll, a new core taken from bin 106 can be placed between spindles 120 and arms 110 and 112 pivoted together, with the next strip of sod being initially wrapped thereon and the process repeated. In the most preferred form, cylinder 126 can be automatically controlled to open arms 110 and 112 after tractor 12 has traveled the required distance such as determined by a timer circuit receiving an input from encoder 128 and to close arms 110 and 112 after sufficient time has passed for an operator to place a new core between spindles 120 and/or switches can be mounted on bin 106 for operation by the operator supervising roll-up apparatus 108. It should be appreciated that the cone shapes of spindles 120 allow the quick insertion of the new core by the operator while tractor 12 is still moving and cutting more sod. Additionally, due to the preferred construction of roll-up apparatus 108, it can be appreciated that arms 110 and 112 will move together to simultaneously release the core of the sod roll. If arms 110 and 112 did not move together and one arm 110 and 112 could move without movement of the other, the core can be released from one side before the other side which would cause the roll to be dragged by spindle 120 which is still engaged, potentially harming the sod of the roll which engages the ground.

It should further be appreciated that the width and number of rolls of sod can be adjustably determined by the number and placement of coulter wheels 104 attached to shaft 100, with coulter wheels 104 being axially slideable and adjustable on shaft 100.

Apparatus 10 according to the preferred teachings of the present invention allows the sod to be harvested in large rolls without being manually lifted. Additionally, apparatus 10 according to the preferred teachings of the present invention allows increased productivity. Also, due to cutting unit 16 being underslung from the frame of tractor 12 and apparatus 10 being centered on tractor 12, better visibility is provided and apparatus 10 can cut back and forth along one edge of a sod field and there is no need to move to the opposite edge of a sod field as is required where the sod cutting is accomplished on one side of tractor 12. Additionally, apparatus 10 allows high flotation tires to be utilized for tractor 12 such that operation can be accomplished in soft, moist sod fields and such that compaction of the soil as well as wheel marks during wet conditions can be substantially eliminated.

It should further be appreciated that apparatus 10 including cut-off device 14, cutting unit 16, and device 18 of the preferred form of the present invention is believed to be advantageous and produce synergistic results. However, it can be appreciated that cut-off device 14, cutting unit 16, and device 18 can be utilized separately or in other combinations with other types of units and devices. For example, cutting unit 16 could cut multiple strips of sod which are cut to the desired length of conventional sod pieces by cut-off device 14 which can be rolled and/or stacked rather than rolled into large rolls by device 18.

Although first and second vibrating devices 84 are shown mounted on legs 72 of blade assembly 66 in the most preferred form, vibrating devices 84 could be mounted at other locations such as to a cross bar extending between legs 72 above and parallel to support 76..

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Method for harvesting sod from turf of a sod field comprising the steps of: providing a blade; vibrating the blade at a high frequency in the range of 3,000 to 7,000 cycles per minute and at a low amplitude in the range of 0.15 to 1.27 centimeters; lowering the vibrating blade to enter the turf of the sod field; and moving the vibrating blade forward after the blade has entered the turf to sever the roots of the turf.

2. The sod harvesting method of claim 1 wherein the providing step comprises the step of providing a blade assembly pivotally mounted to an apparatus frame and including the blade having a cutting edge, with the blade assembly being pivotably mounted to the apparatus frame about a pivot axis located vertically above the cutting edge of the blade; and wherein the moving step comprises the step of moving the apparatus frame forward on the sod field; and wherein the vibrating step comprises vibrating the blade assembly as a single component about the pivot axis.

3. The sod harvesting method of claim 2 wherein the providing step comprises the step of providing the blade assembly including a blade frame of a generally U-shape having first and second legs, with the pivot axis of the blade assembly extending through the upper ends of the first and second legs, with the blade extending between the lower ends of the first and second legs; and wherein the vibrating step comprises the steps of mounting a vibrating device solely to the blade frame and without attachment to the apparatus frame; and actuating the vibrating device to vibrate the blade assembly.

4. The sod harvesting method of claim 3 wherein the providing step comprises the step of providing the blade assembly with the pivot axis directly vertically above the cutting edge of the blade.

5. The sod harvesting method of claim 3 further comprising the steps of: mounting a stop on the apparatus frame spaced from the pivot axis of the blade assembly and in front of and for abutment with the first and second legs of the blade frame; and biasing the first and second legs of the blade frame forward against the stop and for permitting the vibration of the blade assembly.

6. The sod harvesting method of claim 2 wherein the providing step comprises the step of providing the blade assembly with the pivot axis directly vertically above the cutting edge of the blade.

7. The sod harvesting method of claim 2 further comprising the step of rotatably mounting a drum roller having a width perpendicular to the forward movement generally equal to the width of the blade perpendicular to the forward movement for compressing the sod in the forward movement just ahead of the blade.

8. The sod harvesting method of claim 7 further comprising the step of rotatably mounting at least two coulter wheels ahead of the drum roller for cutting the sod parallel to the forward movement.

9. The sod harvesting method of claim 8 further comprising the step of moving the drum roller relative to the blade and while the vibrating blade is being moved forward.

10. The sod harvesting method of claim 9 further comprising the step of simultaneously lowering the drum and the coulter wheels with the lowering of the vibrating means.

11. The sod harvesting method of claims 7 further comprising the step of moving the drum roller relative to the blade and while the vibrating blade is being moved forward.

12. The sod harvesting method of claim 2 wherein the providing step comprises the step of providing the blade assembly including a blade frame of a generally U-shape having first and second legs, with the pivot axis of the blade assembly extending through the upper ends of the first and second legs, with the blade extending between the lower ends of the first-and second legs; and wherein the method further comprises the steps of mounting a stop on the apparatus frame spaced from the pivot axis of the blade assembly and in front of and for abutment with the first and second legs of the blade frame; and biasing the first and second legs of the blade frame forward against the stop and for permitting the vibration of the blade assembly.

13. The sod harvesting method of claim 1 wherein the vibrating step comprises the step of vibrating the blade at the high frequency in the order of 5,000 cycles per minute.

14. The sod harvesting method of claim 13 wherein the vibrating step comprises the step of vibrating the blade at the low amplitude in the order of 0.15 centimeters.

15. The sod harvesting method of claim 1 wherein the vibrating step comprises the step of vibrating the blade at the low amplitude in the order of 0.15 centimeters.

\* \* \* \* \*